United States Patent
Nishioka et al.

[11] Patent Number: 5,479,550
[45] Date of Patent: Dec. 26, 1995

[54] IMAGE FIBER

[75] Inventors: Kimihiko Nishioka, Hachioji; Katsuya Ono, Hino; Masaru Shiraiwa, Hachioji, all of Japan

[73] Assignee: Olympus Optical Co., Ltd., Tokyo, Japan

[21] Appl. No.: 239,529

[22] Filed: May 9, 1994

[30] Foreign Application Priority Data

May 13, 1993 [JP] Japan .................................. 5-111797
Oct. 19, 1993 [JP] Japan .................................. 5-260939

[51] Int. Cl.$^6$ ...................................................... G02B 6/06
[52] U.S. Cl. ................................................ 385/116; 385/117
[58] Field of Search .................................. 385/116, 126, 385/146, 117

[56] References Cited

U.S. PATENT DOCUMENTS 4,613,205  9/1986  Seiji et al. .
5,074,642  12/1991 Hicks .
5,195,151  3/1993  Campbell et al. .......................... 385/43

FOREIGN PATENT DOCUMENTS 1259304  10/1989  Japan .

OTHER PUBLICATIONS

Hosono, Transmission of Characteristics of Image Fiber, Institute of Electronic and Communication Engineering of Japan, vol. J66–C, No. 11, pp. 843–850, Nov. 1983.
Ohkoshi et al, Wave Theory of Uniform–core Fibers, Optical Fibers, Ohm Co., Ltd. Sep. 1984 pp. 53–87.

Primary Examiner—Rodney B. Bovernick
Assistant Examiner—Robert E. Wise
Attorney, Agent, or Firm—Cushman, Darby & Cushman

[57] ABSTRACT

An image fiber has a plurality of optical fibers with normalized frequencies different from one another, which is constructed so that a plurality of cores different in size and shape from one another are distributed at random in a cladding. The optical fibers include at least two kinds of optical fibers having propagation modes different in number. Thus, the image fiber is capable of suppressing cross talk to prevent the degradation of image quality.

20 Claims, 4 Drawing Sheets

1

IMAGE FIBER

BACKGROUND OF THE INVENTION a) Field of the Invention

The present invention relates to an image fiber which has a tiny outside diameter and is capable of forming images of high quality.

b) Description of the Prior Art

Image fibers of this type which are fabricated mainly with quartz are conventionally utilized in medical fiberscopes, such as blood vessel fiberscopes and pyeloscopes, as well as fiberscopes for industrial inspections.

An endoscope 1 which is illustrated in FIG. 1, for example, is known as a conventional endoscope using an image fiber. An image T' of an object T illuminated with an illumination optical system (not shown) is formed by an objective lens system 2, as illustrated in FIG. 1, on an end surface of incidence 3a of an image fiber 3 which is composed of a bundle of a plurality of fibers (hereinafter referred to as optical fibers.) The image T' formed on the end surface of incidence 3a is allowed to emerge from an end surface of emergence 3b of the image fiber 3 for observation through an eyepiece 4.

Along with the recent progress made for reducing diameters of the fiberscopes, research and development are being made to configure an endoscope with an outside diameter smaller than 1 mm so that the endoscope 1 is usable for observing the interiors of blood vessels.

The image fiber which is used in the endoscope described above cannot always form images of satisfactory quality since it has a very small outside diameter on the order of several hundred micrometers, comprises cores each having a diameter of several micrometers and uses two to three thousand pixels.

The image fiber having such a small outside diameter mainly employs a composition referred to as "fiber conduit" in which optical fibers are made integral and arranged in a common cladding.

FIG. 2 is a sectional view schematically showing a fiber conduit 5 which is composed of a plurality of cores 7 arranged apart from one another in a common cladding 6.

However, the conventional image fiber 3 which is composed as described above has the disadvantage that it has a large diameter as a whole and can hardly be flexed when the number of the cores 7 arranged in the cladding 6 is increased to enhance the resolution of the image fiber 3 itself. When the cores 7 are arranged with spacings narrower than several micrometers, on the other hand, light incident on one of the cores 7 shifts into adjacent cores 7. This fact causes the problem that the image fiber is apt to produce a phenomenon referred to as blurring of light or cross talk of light and allows transmitted images to be blurred.

This phenomenon becomes noticeable in particular in the case where the cores are arranged with spacings narrower than 10 micrometers to reduce the outside diameter of the image fiber 3. Therefore, it is necessary to use a cladding 6 which is thick enough between the cores 7 for preventing the phenomenon of cross talk among the cores.

In recent years, however it has been desired that even the image fiber having such a small outside diameter be equipped with a high density of pixels. It is necessary for satisfying this desire to reduce the diameters of the cores 7 and to thin the cladding 6 lying among the cores 7 so as to enhance a density of pixels (or a density of the cores 7).

When the cores 7 are arranged with narrower spacings and the cladding 6 is several times thinner than wavelengths of light, however, cross talk is caused by mode coupling among the fibers, thereby resulting in remarkable degradation in image quality.

For preventing such degradation in image quality from being caused by the cross talk, it is necessary to thicken the cladding 6, but such thickening of the cladding 6 will lower a ratio of an area occupied by the cores within a unit sectional area of the image fiber. This causes the defect that it becomes impossible to obtain bright images and a high density of pixels.

The necessity to prevent cross talk makes it difficult for the prior art to provide an image fiber having a high resolving power.

SUMMARY OF THE INVENTION

It is, therefore, an object of the present invention to provide an image fiber which is capable of preventing the degradation in image quality by suppressing cross talk, is free from nonuniformity in brightness, and has a tiny outside diameter and a high resolving power.

According to one aspect of the present invention, the image fiber is composed of a plurality of cores which have sizes and shapes different from one another, and are distributed at random in a cladding so that optical fibers adjacent to one another have different propagation constants.

According to another aspect of the present invention, the image fiber has a plurality of cores covered with a common cladding and is constructed so that multi-component glass is used as a material of the cores, a diametral ratio of a cladding element to a core element is made substantially constant, optical fiber elements are used in which the peripheries of core elements are covered with the cladding element, and at least, a plurality of optical fiber elements having different diameters are heated and drawn down in a bundle. This image fiber is designed so that the cores have a refractive index of at least 1.55 and the cladding has an average thickness $\bar{c}$ satisfying the condition:

$$(0.495/NA)^4 \times \sqrt[4]{l/3.5} \ \lambda < \bar{c} < 4\bar{\lambda} \tag{1}$$

where l is the total length of the image fiber bundle and $\bar{\lambda}$ is an average wavelength of light.

According to still another aspect of the present invention, the image fiber has a total length of 10 m or shorter.

According to a further aspect of the present invention, the image fiber is composed so that the difference between the core diameters is at least 0.05 micrometers, the ratio of the core diameters is 1.5 or less, and the cladding has an average thickness $\bar{c}$ satisfying the condition:

$$\bar{\lambda} \leq \bar{c} \leq 4\bar{\lambda} \tag{2}$$

Since the fiber element can be regarded as a kind of wave guide from a view point of the wave theory, when light is incident on the optical fibers, energies of various wave modes are excited in the cores and the light is transmitted by propagation of the energies of the wave modes through the optical fibers. The image fiber has light transmission characteristics which can be analyzed as an accumulation of a multiple optical waveguide.

The phenomenon of cross talk is analyzed in the paper "Transmission characteristics of image fibers" (The transactions of the Institute of Electronics and Communication Engineering of Japan, Vol. J-66-C, No. 11, Nov. 1983), and the state of the cross talk can be estimated from the formula shown in the paper. The value of the cross talk parameter (hereinafter referred to as a B value) given in the paper represents the magnitude of the cross talk. The cross talk becomes remarkable as the B value increases. Specifically, the B value, for example, of an $LP_{01}$ mode is given by $$B = [\{-2u_{01}^2 K_0(w_{01}d/a)\} / \{v^2 K_1^2(w_{01})\}] \cdot z/\beta \quad (3)$$

where $u_{01}$ and $w_{01}$ are characteristic values of the $LP_{01}$ mode, a is the core radius of an optical fiber, d is the pitch of the optical fibers, z is the length of the optical fibers, $\beta$ is the propagation constant of the $LP_{01}$ mode, and $K_m$ is the m-th order modified Bessel function of the second kind. Further, v is the normalized frequency depending on the specification of the optical fiber and is expressed by $$V = ka \sqrt{n_1^2 - n_2^2} \quad (4)$$

where $k=2\pi/\lambda$ ($\lambda$ is the wavelength of light propagated through an optical fiber) and $n_1$ and $n_2$ are refractive indices of the core and the cladding, respectively.

Now, as shown in FIG. 3, it is assumed that a core 12 and a cladding 13 are taken out which are used for composing an image fiber 10, and this image fiber is regarded as a single optical fiber. Though the cladding 13 is actually connected between adjacent optical fibers 11, it is assumed that the cladding 13 is separated in accordance with a ratio between the diameters of the core of interest and the adjacent core 12. The thickness of the cladding 13 is represented by c. That is to say, the thickness c corresponds to the cladding thickness for the core 12 of the image fiber 10.

When refractive indices of the core 12 and the cladding are represented by $n_1$ and $n_2$, respectively, the optical fiber 11 has a capability to enclose light within the core 12 which is defined by the following equation and higher as NA has a larger value:

$$NA = \sqrt{n_1^2 - n_2^2} \quad (5)$$

For enhancing the capability of the optical fiber to enclose light within the core 12, it is only necessary to increase the refractive index $n_1$ of the core 12 and lower the refractive index $n_z$ of the cladding 13.

For other modes of higher order, the B value can also be derived from the consideration shown in the above paper.

On the basis of the consideration shown in the above paper, B values of an image fiber are calculated in terms of a light wavelength of 500 nm, a core diameter of 1.95 μm, a pixel spacing of 3.68 μm, a numerical aperture of 0.49, and a fiber length of 1.5 m. The result is listed in Table 1 shown below.

TABLE 1

| Mode | $LP_{01}$ | $LP_{11}$ | $LP_{21}$ | $LP_{02}$ | $LP_{31}$ | $LP_{12}$ |
|------|-----------|-----------|-----------|-----------|-----------|-----------|
| \|B\| | 0.42936 | 2.3524 | 12.2005 | 39.9804 | 129.37 | 704.75 |

Since the $LP_{01}$ mode has a smallest B value as seen from Table 1, it is estimated that the cross talk in the $LP_{01}$ mode is smallest.

Light transmitted through the optical fiber is regarded as a linear coupling of the modes and represented by $E_{total}$, which is expressed by $$E_{total} = \sum_m \sum_l A_{ml} E_{ml} \quad (6)$$

wherein $A_{ml}$ is a weight of each mode and $E_{ml}$ is an electric field distribution function (mode function).

The weight $A_{ml}$ is dependent on the electric field distribution function of light which is incident on an end surface of the optical fiber and calculated by $$A_{ml} = \frac{\int_0^\infty \int_0^{2\pi} O(r, \theta) E_{ml}(r, \theta) \, r \, dr \, d\theta}{\int_0^\infty \int_0^{2\pi} [E_{ml}(r, \theta)]^2 \, r \, dr \, d\theta} \quad (7)$$

wherein $O(r, \theta)$ is an electric field distribution of the incident light, and r and $\theta$ are a distance and an angle, respectively, on a polar coordinates system on which a core center of the optical fiber is taken as an origin.

Since the $LP_{01}$ mode produces the cross talk of the lowest magnitude as described above, it will be understood from formula (6) that a total of the cross talk to be transmitted through the optical fiber is minimized by selecting incident light for which the $LP_{01}$ mode has a weight heavier than those of the other modes.

The foregoing description has been made on an assumption that optical fibers composing the image fiber have the propagation constants $\beta$ equal to one another, without considering the cross talk to be produced among the optical fibers having propagation constants $\beta$ which are different from one another.

In an actual image fiber, the phenomenon of the cross talk is produced between the optical fibers having different propagation constants since mode conversion takes place because of various factors such as fluctuations of refractive indices, nonuniformity of interfaces formed between the cores and the claddings, and scattering caused by impurities mixed in the optical fibers. However, the cross talk to be produced in the case where the propagation constants $\beta$ are different has a magnitude lower than that to be produced in the other case where the propagation constants are equal to one another. For obtaining the propagation constants which are different from one another, it is only necessary to select different values of the normalized frequency V.

It will be understood from formula (4) that the value of V is dependent on the core radius a. Paying attention to this fact, the so-called random image fiber is known as a provision to suppress the cross talk. Specifically, the random image fiber, as shown in FIG. 4, is configured so as to reduce the cross talk by distributing, at random in a cladding 9, a plurality of cores 8 which are different in size and shape, and differentiating the propagation constants $\beta$ among adjacent optical fibers.

Consider only the cross talk to be produced among adjacent cores 8. In order that the nearest two of the cores 8 always have V values which are different from each other, it is necessary to use at least three kinds of optical fibers even when the optical fibers are regularly arranged in a definite sequence. Therefore, the conventional random image fibers are available in some examples each using three kinds of optical fibers. However, optical fibers are arranged in an adequately mixed condition since it is practically difficult to regularly arrange thousands of optical fibers. In this case, the probability where adjacent optical fibers, of an n kind of fibers, are not of the same kind is calculated by $$\frac{(n-1)(n-2)\{(n-2)^4-(n-2)^3+(n-2)^2-(n-2)+1\}}{n^6} \quad (8)$$

When n is 3 in this equation, it gives a very low probability of 0.27%.

In view of this fact, the present invention aims at the enhancement of this probability and the improvement of image quality by using more kinds of optical fibers. The probability can be enhanced to 4.7% which is approximately 17 times as high as 0.27% by using, for example, five kinds of optical fibers (n=5). Similarly, for the probability where a given optical fiber and one or two adjacent cores are of the same kind, it is understood that image qualities can be rapidly improved by using five or more kinds of optical fibers. If the V values of different optical fibers are different, the cross talk will diminish in principle, but the V value of an optical fiber on fabrication usually has a variation of nearly 1%. In order to keep a useful difference, it is desirable that the V values differ by at least 5% from one another.

Further, although large differences in the V values of the optical fibers constituting the image fiber reduce the cross talk more remarkably, too large differences increase the difference of the amount of light transmitted through the optical fibers because of variations of the core diameters, thereby producing a defect such as nonuniformity in brightness. It is therefore desirable for reducing the cross talk to use at least one optical fiber having a different number of propagation modes so that it makes the highest mode independent of optical fibers having small V values. In this case, the differences in the V values may be small and the defect, such as nonuniformity in brightness, due to the differences in core diameters can be suppressed to ignorable levels.

From the principle that energies of lower modes produce the cross talk of low magnitudes as described above, it will be understood that when two optical fibers, for example, are configured so as to have different numbers of modes permitting propagation of light, light of a highest mode which can propagate through one optical fiber cannot be transmitted through another optical fiber, and thus the cross talk is not produced. The differences in the V values must be as large as possible for reducing the cross talk by utilizing only the differences in the V values, but the cross talk can also be reduced to some degree by selecting small differences in the V values in such a way that the optical fibers have different numbers of modes.

FIG. 5 shows a graph illustrating dispersion characteristics of optical fibers which comprise uniformly distributed cores, which shows the relationship between the normalized frequency (V value) and the propagation constant ($\beta$) (quoted from "Optical Fiber": written by T. Ohkoshi et al. and issued from Ohm, Co., Ltd.). In this drawing, the abscissa represents the V value and the ordinate represents $\beta/k$ (k: wavelength). In addition, the ordinate also indicates the normalized variable (b) calculated by $$b = \frac{\beta^2 - k^2 n_2^2}{k^2 n_1^2 - k^2 n_2^2} \approx \frac{\beta - k n_2}{k n_1 - k n_2} \quad (9)$$

As seen from FIG. 5, a dispersion curve A, for example, indicates the $LP_{01}$ mode which is the lowest order mode and light of this mode always propagates through the optical fiber, irrespective of the V value (has no cutoff frequency), whereas higher modes B, C, D, E, F and G have cutoff frequencies. The dispersion curve B which indicates the $LP_{11}$ mode, for example, is discontinuous at V=2.205 means that light of the $LP_{11}$ mode is not excited in an optical fiber having V<2.205 even when the constant $\beta$ is optionally set, and the light of this mode can not propagate through the optical fiber.

Similarly, the $LP_{21}$ mode C and $LP_{02}$ mode D are set in cutoff conditions at V=3.83. In a case where a first optical fiber is set for a V value of 3 and a second optical fiber is set for a V value of 4, light of the $LP_{01}$, $LP_{11}$, $LP_{21}$ and $LP_{02}$ modes can propagate through the second optical fiber, but only the $LP_{01}$ and $LP_{11}$ modes through the first optical fiber. As a result, the cross talk is not produced between the first and second optical fibers, thereby reducing cross talk as a whole in an image fiber in which these two kinds of optical fibers are mixed, since light of the $LP_{21}$ mode and the $LP_{02}$ mode propagate through the second optical fiber only.

Now, a description will be made of a transmission efficiency of light through an image fiber. In order to configure an image fiber so as to have a small outside diameter and a high resolving power, it is inevitably necessary to arrange optical fibers with narrow spacings and use cores having small diameters. Cores having smaller diameters reduces a number of propagation modes and a single mode is obtained when the V value becomes 2.405 or smaller.

FIG. 6 shows a graph illustrating ratios of energies of the modes (wavelength: 600 nm) which are excited when light having an F number of 1.4 is incident on an optical fiber having a numerical aperture (NA) of 0.5. In this drawing, the abscissa represents core diameters and the ordinate represents energy ratios on optional scales. As seen from this graph, not only the $LP_{01}$ mode A but also the $LP_{11}$ mode B and the $LP_{21}$ mode C transmit energies at high ratios. Further, it is estimated that a core diameter of at least approximately 1 micrometer is necessary for propagating the light of the $LP_{11}$ mode B, and a core diameter of at least approximately 1.5 micrometers is required for propagating the light of the $LP_{21}$ mode C, whereby brightness is remarkably lowered when core diameters are smaller. Furthermore, brightness is similarly lowered when incident light bundles have F numbers within a range form 2 to 1.

It is therefore necessary for reserving required brightness to propagate the light of the $LP_{11}$ mode in a visible region (approximately 400 nm to 650 nm), and to satisfy the condition:

$$V > 2.405 \quad (10)$$

It is further desirable for obtaining a sufficiently high transmission efficiency that the light of the $LP_{21}$ mode C can also be propagated. For propagating the light of the $LP_{21}$ mode C, it is necessary to satisfy the condition:

$$V > 3.83 \quad (11)$$

Since the random image fiber consists of a bundle of a plurality of optical fibers having different V values, it is sufficient for practical use that optical fibers having a middle value of diameters, or middle thickness, satisfies condition (11). Further, it is ideal that all the kinds of optical fibers satisfy conditions (10) and (11). An image fiber which is used for blood vessel endoscopes which are put into practical use has an outside diameter of 0.3 mm and comprises about 3000 cores, each measuring approximately 2 to 3 micrometers and arranged with spacings of 4 micrometers.

In order that condition (11) is satisfied by an image fiber having these specifications, it must satisfy condition:

$$\sqrt{n_1^2 - n_2^2} \geq 0.4 \qquad (12)$$

However, it is desired to obtain an image fiber having approximately ten thousand pixels since an image formed by using approximately 3000 pixels have low quality. For obtaining the image fiber having the specifications described above, it is necessary to select a core diameter of 1 micrometer and a spacing between optical fibers on the order of 2 micrometers, which make it difficult to satisfy condition (11). A condition required for satisfying condition (10) at slightly lowered brightness is determined as follows:

$$\sqrt{n_1^2 - n_2^2} \geq 0.498 \qquad (13)$$

Optical fibers must therefore have an NA of at least 0.4 for core diameters smaller than 2 to 3 micrometers, and an NA of at least 0.498 for core diameters smaller than 1 micrometer.

For a thickness d of the cladding, there is the defect that a thinner cladding allows cross talk to increase, whereas too thick a cladding results in insufficient brightness. For obtaining required brightness at a low magnitude of cross talk, it is desirable that the thickness d is defined by $$1.8 \ \mu m > d > 0.8 \ \mu m \qquad (14)$$

For defining an NA within the range specified by condition (12) or (13), it is desirable to select, for the optical fibers, a glass material which is not of a quartz base but of a multi-component base. However, since it is difficult to obtain a cladding having a refractive index of 1.5 or lower when the multi-component glass material is selected, the refractive index $n_1$ of the cores must be defined as $$n_1 > 1.56 \qquad (15)$$

If the refractive index $n_1$ of the cores exceeds 1.7, optical fibers 0.5 to 5 m long will be colored with yellow or green because of the property of the glass material. It is therefore desirable that the refractive index of the cores satisfies a condition of $1.7 > n_1$.

In addition, the cladding can be made of the multi-component glass material so far as the refractive index $n_2$ of the cladding is within a range defined as $$1.53 > n_2 > 1.48 \qquad (16)$$

When fiber elements having different diameters are bundled, the cutoff frequencies in respective modes are different because the V values of the fiber elements are different from one another. Accordingly, the optical fibers which have small core diameters have lower transmission efficiencies, thereby producing a disadvantage from a viewpoint of brightness. In such a case, as will be described later, the lowering of the transmission efficiencies due to the cutoff phenomenon can be lessened by reducing the number of optical fibers having small core diameters and to increase the number of optical fibers having moderate core diameters.

As understood from the foregoing description, the constructions for enhancing the transmission efficiencies and for eliminating the nonuniform brightness may be contradictory to that for reducing cross talk. In a case where very thin optical fibers are used in particular, it may be difficult to reduce the cross talk by varying number of the propagation modes of individual optical fibers since the number of modes of light propagating through the cores is originally small. It is therefore necessary to take balance between the cross talk with the amount of light and brightness taken into consideration in determing configuration parameters (core diameters, refractive indices, etc.) of an actual image fiber.

In a configuration illustrated in FIG. 7, cores 12 are available with five different core diameters a applied to cores 12 are available in five kinds, and these cores 12 having different diameters are distributed at random and moderately in a common cladding 13. In this case, disposed around the cladding 13, or an image fiber 10, is a jacket glass layer 14, which in turn is surrounded by a coated resin layer 15. These components constitute a required fiber scope 100.

For reducing the blurring of light, it is desirable that the cores 12 have V values (normalized frequencies) at a ratio of at least 1.03 as specified below:

$$Vi/Vj \geq 1.03 \qquad (17)$$

where i and j are ordinal numbers indicating different diameters which are selected to compare or specify the core diameters so that $Vi > Vj$.

On the other hand, condition (17) is equivalent to the fact that the ratio between the cope diameters is higher than 1.03 since the V value is expressed as $$V = 2\pi a'/\lambda \cdot NA \qquad (18)$$

where a'=core radius and $\lambda$=wavelength of light.

Within the visible region, light has a wavelength $\lambda$ within a range defined by $$400 \ nm \leq \lambda \leq 700 \ nm \qquad (19)$$

In order to lower a probability at which one of the copes 12 is surrounded by other copes 12 having diameters which is the same as that of the former, it is desirable that at least four kinds of cores having different diameters ape distributed at random and that two different kinds of cores have diameters a which are at least 0.05 micrometer different from each other. This is because if the difference between the core diameters is smaller than 0.05 micrometer, it will be impossible to measure the difference between the core diameters, thereby making it difficult to control qualities of the cores at a manufacturing stage thereof and, on the other hand, it will not be easy to inspect the image fiber with an optical microscope since the optical microscope has a resolution of nearly 0.2 micrometer at a maximum.

On the other hand, it is desirable that the highest ratio between the diameters of the cores 12, i.e., a ratio between a maximum value and a minimum value of the core diameters, $a_{max}/a_{min}$ does not exceed 1.5.

It is for this reason that if the ratio is higher than 1.5, cores 12 having large diameters are distributed from place to place, thereby locally lowering the resolution of an image. It is preferable that the ratio is lower than 1.3, if possible.

Further, it is necessary for reserving required brightness of the image fiber 10 to enhance a ratio of area occupied by the cores. This ratio should desirably be within a range defined by $$0.45 \leq a_s/b_s \qquad (20)$$

However, the range defined by condition (20) applies to the case where an average spacing $\bar{d}$ between the optical fibers is nearly 3.8 micrometers. For suppressing the blurring of light and for reserving a value of the cladding thickness c which is larger than a certain required level in the case where the spacing $\bar{d}$ has smaller values, the allowable values of the ratio are given by $$0.2 \leq a_s/b_s \tag{21}$$

In this case, it is desirable for reducing the blurring of light that $a_s/b_s$ has values smaller than 0.8, and values smaller than 0.65 when the amount of transmitted light can be reduced.

Further, the blurring of light is largely influenced by an average value $\bar{c}$ of the thickness c of the cladding 13 which is provided in the image fiber 10. It is therefore desirable that the average value $\bar{c}$ is determined by $$\bar{c} = \bar{d} - \bar{a}/2 \tag{22}$$

wherein $\bar{a}$ is an average value of core diameters.

Since light propagates through the cores while slightly leaking into the cladding 13 and an electromagnetic field is attenuated in the cladding nearly exponentially, it is only necessary that $\bar{c}$ has a value defined by $$\bar{\lambda} \leq \bar{c} \leq 2.5\bar{\lambda} \tag{23}$$

where $\bar{\lambda}$ is an average wavelength of 0.55 micrometer in the visible region or may be 0.6 to 0.65 micrometer when the image fiber is to be used for medical endoscopes which are often applied to the observation of reddish objects.

If the average thickness $\bar{c}$ of the cladding is smaller than the lower limit of condition (23), the blurring of light will be remarkable. If the average thickness $\bar{c}$ of the cladding exceeds the upper limit of condition (23), in contrast, the ratio of area to be occupied by the cores will be lowered, thereby making it impossible to reserve the required brightness.

In the image fiber 10 where the average spacing $\bar{d}$ is wider than 5 micrometers, even though the average thickness $\bar{c}$ of the cladding is set to a value defined by condition (2), the ratio of the area to be occupied by the cores does not remarkably reduce, and thus the image fiber bundle 10 is sufficiently usable in practice.

Since the blurring of light monotonously increase at the ¼ power of a length l of the image fiber 10 expressed in meters, it is only necessary that the average value $\bar{c}$ has a value defined by $$\sqrt[4]{l/3.5}\,\bar{\lambda} < \bar{c} < 4\bar{\lambda} \tag{24}$$

Applicability of condition (24) has already been confirmed on the basis of experimental values of the blurring of light which were obtained by using two types of fiber scopes, manufactured by the inventor et al., of two image fibers 1.5 m and 3.5 m long and having large numerical apertures. When $\sqrt[4]{l/3.5}$ has a value smaller than 0.6 in condition (24), however, $\sqrt[4]{l/3.5}$ should be replaced with 0.6 $\bar{\lambda}$.

Furthermore, it is known that the amount of light to be enclosed within the cores of the image fiber 10 is proportional to $NA^2 = n_1^2 - n_2^2$ from a viewpoint of the geometrical optics. Though this applies approximately to the image fiber 10 when it is considered from a viewpoint of the wave optics, it is necessary to take account of a ratio of the blurring of light to be captured by adjacent optical fibers since the blurring of light is a series of phenomena produced between two adjacent optical fibers.

Since it is estimated that the captured ratio of the blurring of light is generally proportional to $1/NA^2$, the blurring of light is proportional to $1/N^4$.

Hence, formula (1) can be derived from the considerations and results of the experiments described above. In the case where $\sqrt[4]{l/3.5}$ is smaller than 0.6 in formula (1), however, $\sqrt[4]{l/3.5}$ should be replaced with 0.6 $\bar{\lambda}$ as already described above. It is therefore possible to obtain an image fiber 10 which minimizes the blurring of light by selecting a value of the average thickness $\bar{c}$ for the cladding 13 which satisfies condition (1).

In order to prevent a contrast of transmitted images from being lowered by flare produced by light which is not transmitted through the cores 12 and reflected by the jacket glass layer formed around the cladding 13, it is necessary to satisfy the condition:

$$n_3 > n_2 \tag{250}$$

where $n_3$ is a refractive index of the jacket glass layer 14.

For allowing this unwanted light to be absorbed by the coated resin layer 15 which contains fine carbon particles, etc. as light absorbing materials, it is desirable to satisfy the condition:

$$n_2 > n_4 \tag{26}$$

where $n_4$ is a portion of a real number of the coated resin layer 15.

In order that the light incident on the jacket glass layer 14 is not transmitted but absorbed by the coated resin layer 15, it is desirable to satisfy the condition:

$$n_3 > n_4 \tag{27}$$

However, the image fiber 10 is sufficiently usable in practice even when condition (27) is not satisfied.

Although condition (1) is required for eliminating the unwanted light, it is also desirable to satisfy the condition:

$$1.05 > n_3/n_2 > 1.003 \tag{28}$$

Condition (28) defines the lower limit of $n_3/n_2$ which is required for satisfying condition (1) even when refractive indices are changed by annealing the multi-component material. When the upper limit of condition (28) is exceeded, it will be difficult to obtain a material for the jacket glass layer 14 which has a linear expansion coefficient nearly equal to that of the cladding 13.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
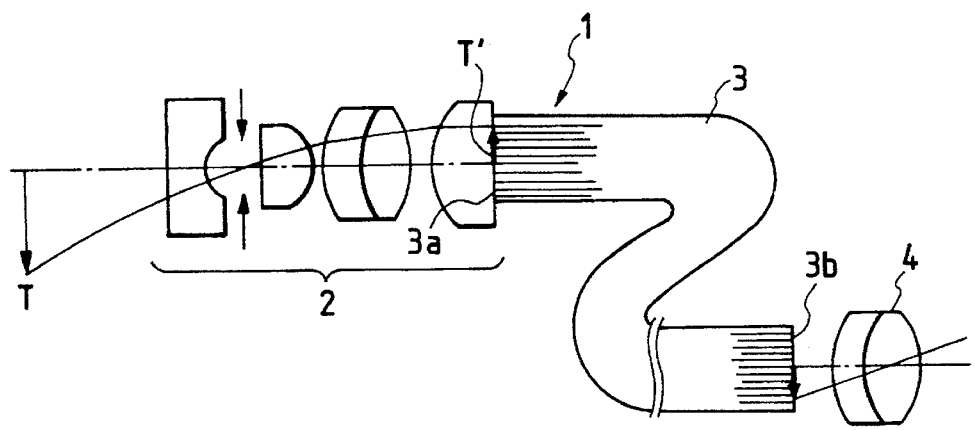
FIG. 1 is a sectional view schematically illustrating a configuration of a conventional endoscope using an image fiber.
Figure 2:
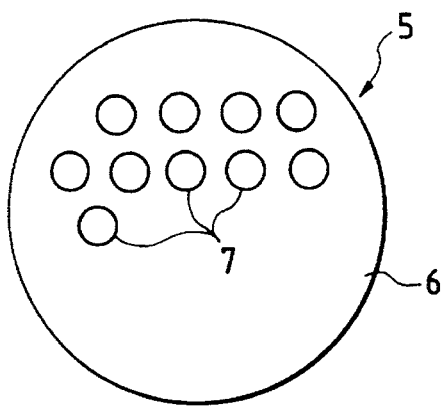
FIG. 2 is a sectional view illustrating a configuration of a fiber conduit of the image fiber used in the endoscope shown in FIG. 1.
Figure 3:
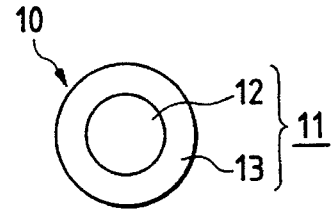
FIG. 3 is a sectional view descriptive of the image fiber according to the present invention.
Figure 4:
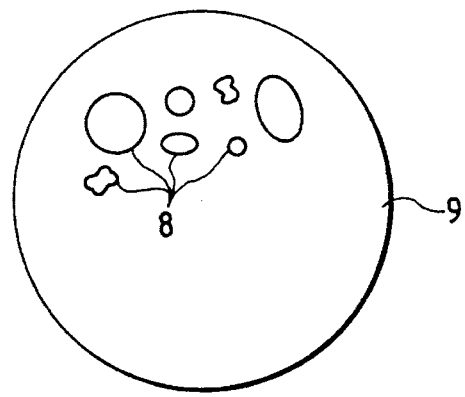
FIG. 4 is a sectional view illustrating a general configuration of the random image fiber according to the present invention comprising a plurality of cores different in size and shape thereof.
Figure 5:
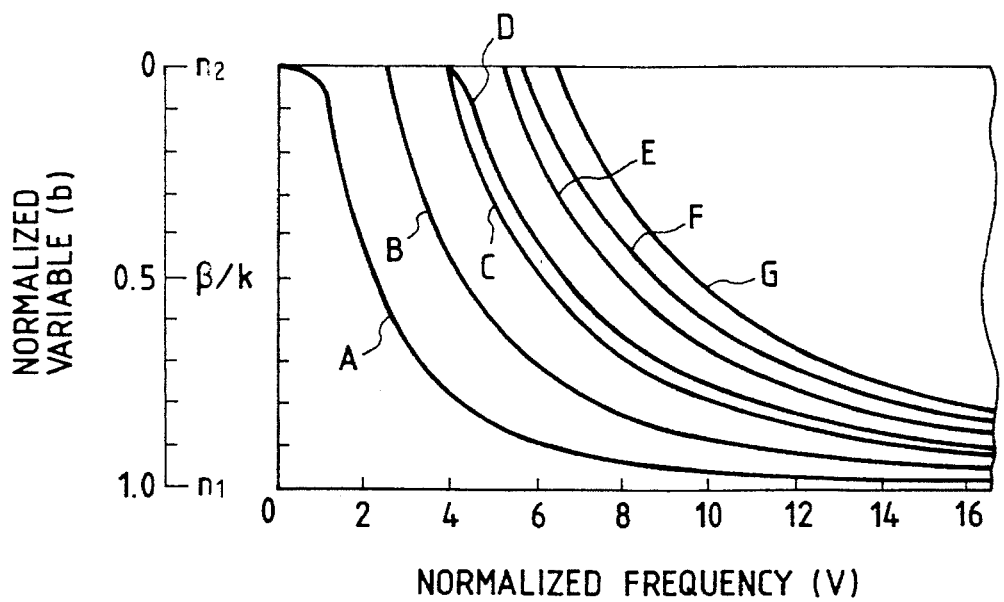
FIG. 5 shows a graph illustrating the distribution curves of optical fibers using uniform cores.
Figure 6:
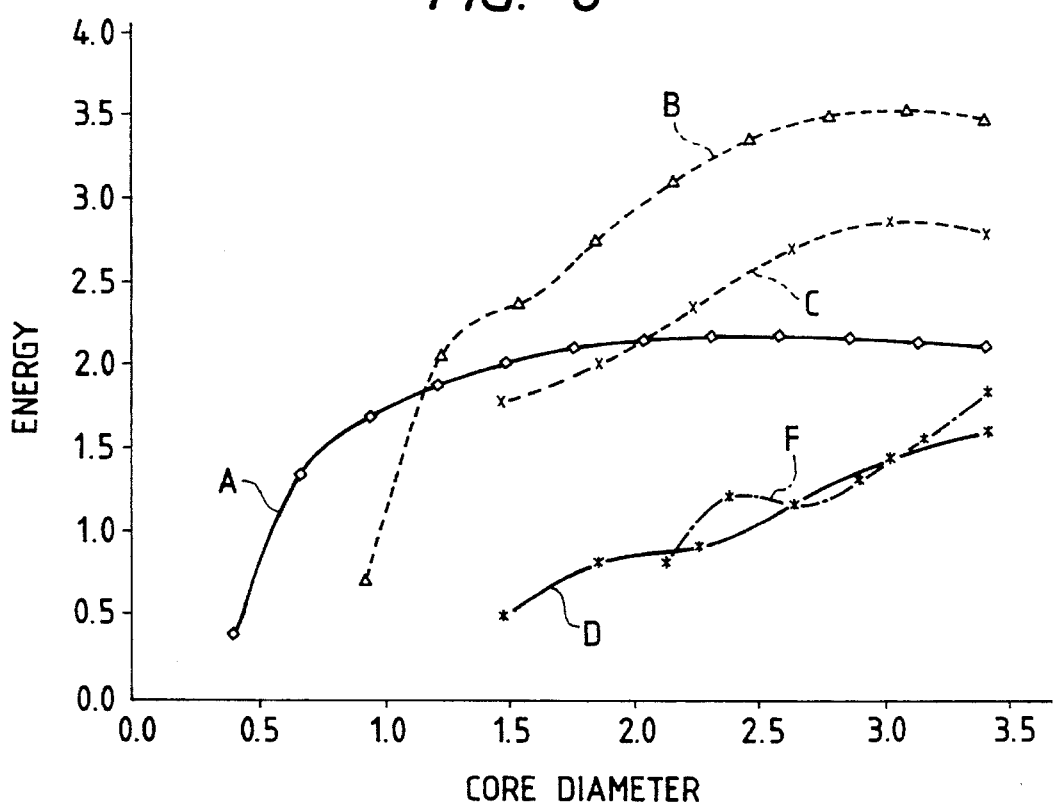
FIG. 6 shows a graph illustrating the ratio of excited energies of modes versus core diameters.

In accordance with the embodiments, the image fiber according to the present invention will be described in detail below.

In Tables 2 through 5 which are to be described later, all of the cladding diameters, core diameters (elements), core diameters (after spinning) and spacings between fibers are expressed in "micrometers".

FIRST EMBODIMENT

TABLE 2

| Outside diameter of cladding | Core diameter (element) | Core diameter (after spinning) | Spacing between fibers | V value |
| --- | --- | --- | --- | --- |
| 360 | 260 | 2.88 | 3.8 | 6.89 |
|  | 245 | 2.72 |  | 6.50 |
|  | 230 | 2.55 |  | 6.10 |
|  | 215 | 2.38 |  | 5.69 |
|  | 200 | 2.32 |  | 5.31 |

(NA = 0.495, λ = 650)

As understood from the numerical data listed in Table 2, the image fiber preferred as the first embodiment is composed of five kinds of optical fibers (elements) having a common cladding diameter and different core diameters which are distributed at random and spun, 600 optical fiber for each kind. Specifically, the optical fibers, after being bundled, are heated and softened, in the condition of which they are drawn down and reduced in diameter. As a result, the cores are fused into a conduit as the image fiber.

The image fiber formed by the processes described above has five different core diameters (after spinning), but the optical fibers are arranged with a constant spacing of 3.8 micrometers. Accordingly, the first embodiment of the present invention is free from nonuniformity in brightness.

When particular light (NA=0.495, λ=650) is made incident on this image fiber, it has five different V values, thereby being capable of reducing cross talk.

The first embodiment of the present invention is thus capable of providing an image fiber which prevents image qualities from being lowered and is free from nonuniformity in brightness, having a tiny outside diameter and high resolution.

SECOND EMBODIMENT

TABLE 3

| Outside diameter of cladding | Core diameter (element) | Core diameter (after spinning) | Spacing between fibers | V value |
| --- | --- | --- | --- | --- |
| 400 | 255 | 2.83 | 3.8 | 6.77 |
| 380 | 243 | 2.69 | in | 6.43 |
| 360 | 230 | 2.55 | average | 6.10 |
| 340 | 217 | 2.41 |  | 5.76 |
| 320 | 204 | 2.26 |  | 5.40 |

(NA = 0.495, λ = 650)

As seen from the numerical data shown in Table 3, the image fiber preferred as the second embodiment of the present invention consists of five kinds of optical fibers (elements) having different cladding diameters and different core diameters which are distributed at random and spun, 600 optical fibers for each kind.

The image fiber formed by the processes described above has five different core diameters (after spinning) and an average spacing of 3.8 micrometers between the optical fibers. Accordingly, the second embodiment of the present invention is capable of cancelling nonuniformity in brightness.

When particular light (NA=0.295, λ=650) is made incident on this image fiber, it has five different V values, thereby being capable of reducing the cross talk. The second embodiment of the present invention thus provides an image fiber which is capable of preventing image qualities from being lowered by suppressing cross talk, is free from nonuniformity in brightness, and has a tiny outside diameter and high resolution.

THIRD EMBODIMENT

TABLE 4

| Core diameter | Spacing between fibers | V value |
| --- | --- | --- |
| 1.13 | 2 | 3.09 |
| 1.07 |  | 2.90 |
| 1 |  | 2.71 |
| 0.93 |  | 2.52 |
| 0.87 |  | 2.35 |

(NA = 0.56, λ = 650)

Table 4 lists numerical data clarifying a configuration of the optical fibers after spinning. The image fiber preferred as the third embodiment of the present invention is configured as a single mode (λ=650) in an optical fiber which has the smallest core diameter (after spinning). Thus, the image fiber is composed of cores having a largest diameter (core diameter=1.13) and a smallest diameter (core diameter=0.87), each at 15% of a total number of the optical fibers, cores having the second largest diameter (core diameter=1.07) and the second smallest diameter (core diameter=0.93), each at 25%, and the rest cores (core diameter=1) at 20%.

Since the significance of using the different kinds of optical fibers is lowered if a specific kind of optical fiber is used at a high percentage, it therefore is desirable that the optical fibers be distributed at random so that the difference in percentage between both is within a range of approximately 10%.

The third embodiment of the present invention which has the configuration described above is also capable of suppressing cross talk to prevent the degradation of image quality, free from nonuniformity in brightness, and has a small outside diameter and a high resolving power.

FOURTH EMBODIMENT

TABLE 5

| Core diameter (after spinning) | Spacing between fibers | V value | Number of propagation mode |
|---|---|---|---|
| 1.7 | 2.5 | 4.11 | 4 |
| 1.6 |  | 3.87 | 4 |
| 1.5 |  | 3.62 | 2 |
| 1.4 |  | 3.38 | 2 |
| 1.3 |  | 3.14 | 2 |

(NA = 0.5, $\lambda$ = 650)

Table 5 shows a configuration of optical fibers. The image fiber preferred as the fourth embodiment of the present invention uses cores (spun), all of which are configured so as to be capable of propagating energy of the $LP_{11}$ mode, and exhibits an effect similar to that of the embodiments described above when the cores are mixed at random in the same ratio.

In the fourth embodiment, the number of modes allowing propagation of light is specified for each kind of optical fiber, and cross talk is reduced by a combination of differences in the V values and differences in the number of propagation modes.

FIFTH EMBODIMENT

Figure 9:
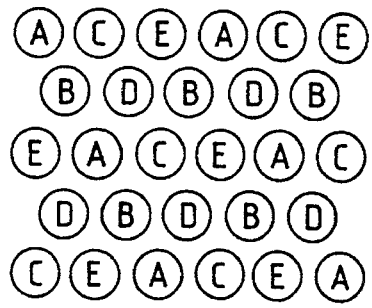
FIG. 9 is a diagram schematically illustrating a configuration of a fifth embodiment of the present invention.
Figure 8:
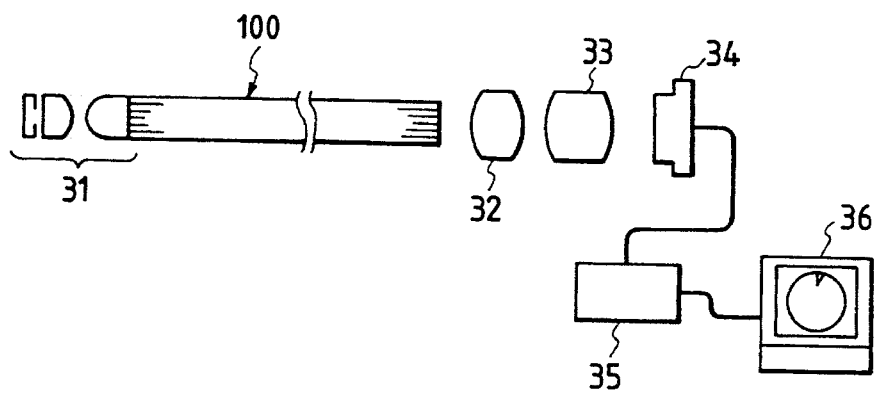
FIG. 8 is a sectional view visualizing a fact that the image fiber according to the present invention is put into practical use as a fiber scope.

The image fiber preferred as the fifth embodiment of the present invention is composed of five kinds of cores listed in Table 2. Specifically, cores (A, B, C, D and E) are orderly arranged in such a manner as shown in FIG. 9. The cores A have a largest diameter, whereas the cores E has a smallest diameter. When the cores (A, B, C, D and E) are arranged as shown in FIG. 9, any core is of a kind which is different from that of any core adjacent thereto, thereby making it possible to obtain an effect similar to that obtained by the embodiments described above.

The fifth embodiment of the present invention is not limited to the configuration described above and can exhibit the similar effect even when it is composed of, for example, four kinds of cores. Further, the configuration of the image fiber according to the present invention is not limited to those described above and can be modified in various manners.

Figure 10:
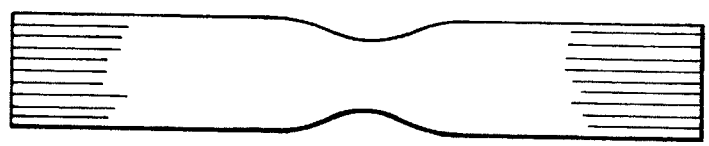
FIG. 10 is a sectional view illustrating one modification of the image fiber according to the present invention.

During the observation of intensity patterns of light formed on the exit surface of the image fiber, the pattern of a high order mode is observed on a core which is apart from a core on which the light is incident. It will therefore be understood that cross talk can be reduced by shielding the light of the high order mode. It is possible to reduce cross talk, for example, by pinching only a portion of an image fiber so that it has a smaller outside diameter as shown in FIG. 10. Specifically, it is possible to propagate only light of low order modes which produce the cross talk of low magnitudes by using an image fiber which shields the light of the high order modes by portion having a small core diameters.

Further, the mode patterns of the optical fibers can be varied so as to reduce the cross talk by another technique, for example, of abruptly cooling a portion of the image fiber at a drawing stage thereof so that residual stress is applied to the interior thereof.

When a transmitted image is observed through an image fiber which is composed of a bundle of optical fibers having different core diameters, nonuniformity in brightness may be produced because brightness per unit area varies with the core diameter. In such a case, nonuniformity in brightness can be eliminated, for example, by processing the image with a TV monitor system (not shown). When a TV camera for endoscopes is to be used, for example, it is practice to photograph an object of white color and take a white balance on the image before performing actual observations. In this case, it is preferable to perform the white balance and luminance adjustment at the same time through a luminance correcting circuit (not shown).

SIXTH EMBODIMENT

Figure 7:
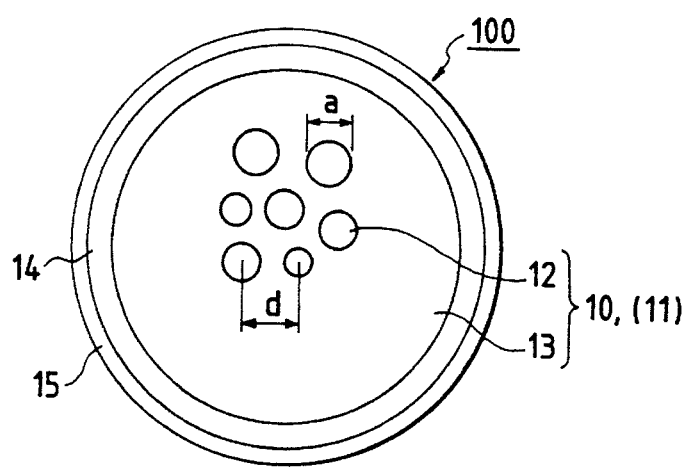
FIG. 7 is a sectional view illustrating another general configuration of the image fiber according to the present invention.

The sixth embodiment of the present invention is the fiberscope 100 using the image fiber 10 which comprises five kinds of cores 12 having different diameters and distributed at random in a cladding 13 as shown in FIG. 7 illustrating a sectional configuration. The fiberscope 100 consists of members specified for the numerical data (setting conditions) listed below.

| | Elements used for manufacturing fiberscope | | | |
|---|---|---|---|---|
| | Core element diameter $a_s$ | Cladding element diameter $b_s$ | Number | $a_s/b_s$ value |
| No. 1 | 255$\mu$ + | 400$\mu$ × | 600 | (0.6375) |
| No. 2 | 243$\mu$ + | 380$\mu$ × | 600 | (0.6395) |
| No. 3 | 230$\mu$ + | 360$\mu$ × | 600 | (0.6389) |
| No. 4 | 217$\mu$ + | 340$\mu$ × | 600 | (0.6382) |
| No. 5 | 204$\mu$ + | 320$\mu$ × | 600 | (0.6375) |

Fiberscope obtained

Total length=1.5 m and 3.5 m

Outside diameter=0.3 mm (jacket thickness=0.01 mm, coated layer thickness=0.03 mm)

Total number of pixels=3,000

Core distribution=random

NA=0.295

Refractive indices
  Core ($n_1$)=1.5963
  Cladding ($n_2$)=1.5177
  Jacket Layer ($n_3$)=1.53
  Coated resin layer ($n_4$)=1.5217 (containing carbon)
  $n_3/n_2$=1.0081

Spacing between cores ($\bar{d}$)=3.8$\mu$ in average (4.2$\mu$ to 3.4$\mu$)

Cladding thickness ($\bar{c}$)=0.625$\mu$ in average

| Cores formed | | Core diameter (a) | Number | V value (at 400 nm, 700 nm) | |
|---|---|---|---|---|---|
| No. 1 | $a_{max}$ | 2.83$\mu$ × | 600 | 11.00 | 6.28 |
| No. 2 |  | 2.69$\mu$ × | 600 | 10.45 | 5.97 |
| No. 3 | $\bar{a}$ | 2.55$\mu$ × | 600 | 9.91 | 5.66 |

-continued

| Cores formed | | Core diameter (a) | | Number | V value (at 400 nm, 700 nm) | |
|---|---|---|---|---|---|---|
| No. 4 | | 2.41μ | × | 600 | 9.36 | 5.35 |
| No. 5 | $a_{min}$ | 2.26μ | × | 600 | 8.78 | 5.02 |

The conventional image fiber which is made of quartz, for example, and manufactured by the technique disclosed by Japanese Patent Preliminary Publication No. Hei 1-259304 has refractive indices of approximately $n_1$=1.459 and $n_2$=1.4465, and the image fiber has a capability to enclose light as low as NA=0.19.

When the sixth embodiment of the present invention is compared with this conventional example, it is characteristic of a large value of NA.

Although it is desirable for eliminating the blurring of light that the NA≧0.45, it may be NA≧0.4.

Figure 11:
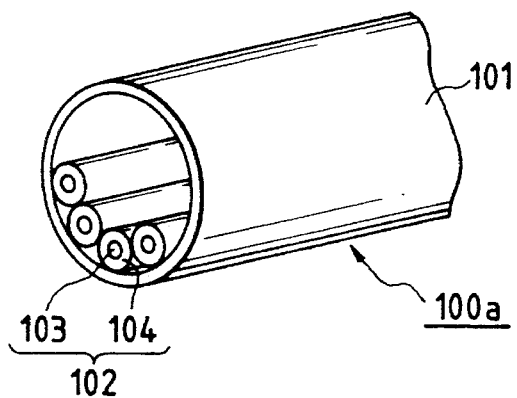
FIGS. 11 and 12 are diagrams descriptive of manufacturing processes of the image fiber according to the present invention.
Figure 12:
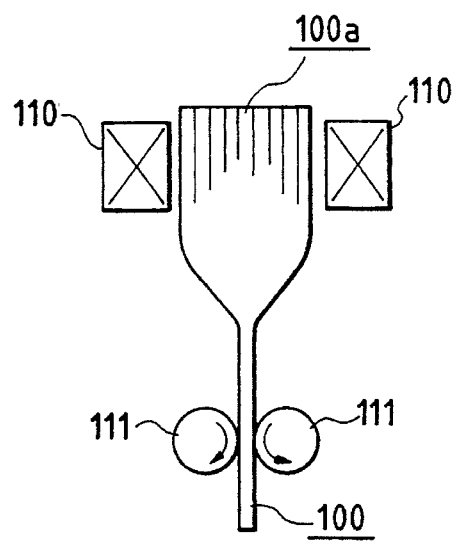

The image fiber 10 preferred as the sixth embodiment of the present invention can be manufactured, for example, in the steps described below. First, as shown in FIG. 11 an image fiber element 100a is prepared by packing a relatively thick jacket pipe 101, which is made of a glass material and has a refractive index $n_3$, with fiber elements 102 each composed of a core element 103 which has a diameter $a_s$ and a refractive index $n_1$, and a cladding element 102 which has a diameter $b_s$ and a refractive index $n_2$ for surrounding outer circumferences of the core element 103. Next, as shown in FIG. 12, the image fiber 10 is manufactured by drawing the image fiber element 100a between rollers 111 while heating it to a required temperature with a heater 110. At this stage, the cladding elements 104 adjacent to one another are bonded to form a cladding 13, whereby a plurality of cores 12 are composed so as to have a common cladding 13. It is necessary that the ratio between the diameter as of the core element 103 and the diameter $b_s$ of the cladding 104 is within a range of ±3%, and that all the fiber elements have the ratios of $a_s/b_s$ which are as equal as possible to one another. This is because of the fiber elements have the values of $a_s/b_s$ which are remarkably different from one another, nonuniformity in brightness will be produced on an image observed on the end surface of the image fiber 10. Such nonuniformity in brightness can be eliminated, for example by image processing.

The fiberscope 100 preferred as the sixth embodiment of the present invention shown in FIG. 7 is composed by using the image fiber 10 which has the features described above, and combined with an objective lens system 31, an eyepiece 32, and a CCD TV camera 33 which is composed of a photographic lens 32, a CCD element 35 and an electronic circuit 36. This fiberscope can form a good image, which is practically free from blurring of light, enough for practical use on a TV monitor 37. In this case, the objective lens system 31 has an F number of 1.4 and the eyepiece 32 has an F number 2.0.

SEVENTH EMBODIMENT

The seventh embodiment of the present invention is a modification of the fiberscope 100 which is preferred as the sixth embodiment shown in FIG. 7, and obtained by enlarging the image fiber in a geometrically similar form and increasing the number of the cores to use 13000 pixels. The seventh embodiment consists of members specified for the numerical data listed below.

| Elements used for manufacturing fiberscope | | | | | |
|---|---|---|---|---|---|
| Core element diameter $a_s$ | | Cladding element diameter $b_s$ | | Number | $a_s/b_s$ value |
| No. 1 | 255μ | + | 400μ | × 2600 | (0.6375) |
| No. 2 | 243μ | + | 380μ | × 2600 | (0.6395) |
| No. 3 | 230μ | + | 360μ | × 2600 | (0.6389) |
| No. 4 | 217μ | + | 340μ | × 2600 | (0.6382) |
| No. 5 | 204μ | + | 320μ | × 2600 | (0.6375) |

Fiberscope obtained

Total length=0.35 m, 0.5 m, 3.5 m and 10.0 m

Outside diameter=0.9 mm (jacket thickness=0.03 mm, coated layer thickness=0.05 mm)

Total number of pixels=13,000

Core distribution=random

NA=0.495

Refractive indices

Core ($n_1$)=1.5963

Cladding ($n_2$)=1.5177

Jacket Layer ($n_3$)=1.53

Coated resin layer ($n_4$)=1.565 (containing carbon)

$n_3/n_2$=1.0081

Spacing between cores ($\bar{d}$)=6.2μ in average (5.5μ to 6.9μ)

Cladding thickness ($\bar{c}$)=1.02μ in average

| Cores formed | | Core diameter (a) | | Number |
|---|---|---|---|---|
| No. 1 | $a_{max}$ | 4.62μ | × | 2600 |
| No. 2 | | 4.39μ | × | 2600 |
| No. 3 | $\bar{a}$ | 4.16μ | × | 2600 |
| No. 4 | | 3.93μ | × | 2600 |
| No. 5 | $a_{min}$ | 3.69μ | × | 2600 |

The seventh embodiment has a value of the average cladding thickness $\bar{c}$ which is approximately 1.6 times as large as that of the sixth embodiment and can provide images less affected by the blurring of light when the fiberscopes have total lengths described above. The blurring of light does not pose any problem in practical use of the seventh embodiment which has the sufficient average cladding thickness so far as it has a total length of approximately 10 m or less. When the seventh embodiment has a total length of 10 m, it satisfies condition (24) because $\sqrt{l/3.5\lambda}$=0.715 and 4$\lambda$=2.2.

EIGHTH EMBODIMENT

The eighth embodiment of the present invention has the same geometrical dimensions as those of the seventh embodiment which has the sectional configuration shown in FIG. 7. The NA value, however, is raised to 0.573 by lowering the refractive index $n_2$ to 1.49. The eighth embodiment consists of members specified for the numerical data listed below.

| Elements used for manufacturing fiberscope | | | | | |
|---|---|---|---|---|---|
| | Core element diameter $a_s$ | | Cladding element diameter $b_s$ | Number | $a_s/b_s$ value |
| No. 1 | 255μ | + | 400μ × | 2600 | (0.6375) |
| No. 2 | 243μ | + | 380μ × | 2600 | (0.6395) |
| No. 3 | 230μ | + | 360μ × | 2600 | (0.6389) |
| No. 4 | 217μ | + | 340μ × | 2600 | (0.6382) |
| No. 5 | 204μ | + | 320μ × | 2600 | (0.6375) |

Fiberscope obtained

Total length=0.35 m, 0.5 m, 3.5 m and 10.0 m

Outside diameter=0.9 mm (jacket thickness=0.03 mm, coated layer thickness=0.05 mm)

Total number of pixels=13,000

Core distribution=random

NA=0.573

Refractive indices
  Core ($n_1$)=1.5963
  Cladding ($n_2$)=1.49
  Jacket Layer ($n_3$)=1.53
  Coated resin layer ($n_4$)=1.565 (containing carbon)
  $n_3/n_2$=1.0081

Spacing between cores ($\bar{d}$)=6.2μ in average (5.5μ to 6.9μ)

Cladding thickness ($\bar{c}$)=1.0268μ in average

| Cores formed | | Core diameter (a) | Number |
|---|---|---|---|
| No. 1 | $a_{max}$ | 4.62μ × | 2600 |
| No. 2 | | 4.39μ × | 2600 |
| No. 3 | $\bar{a}$ | 4.16μ × | 2600 |
| No. 4 | | 3.93μ × | 2600 |
| No. 5 | $a_{min}$ | 3.69μ × | 2600 |

The eight embodiment provides an image fiber which can form images less affected by the blurring of light than those formed by the seventh embodiment. The eighth embodiment can eliminate the unwanted light sufficiently since it uses the coated resin layer 15 having the refractive index of 1.565 which is the same as that adopted for the seventh embodiment. Further, when a multi-component glass material which generally has a refractive index higher than that of quartz is selected, the refractive index $n_2$ of the cladding 13 cannot be lowered beyond a certain limit and should be desirably set within a range defined by the condition:

$$1.47 < n_2 < 1.54 \tag{29}$$

If the refractive index $n_2$ exceeds 1.54, it will be required to use a material having a high refractive index for the cores 12 combined with the cladding 13 and light will be absorbed because of the coloring of glass. It is desirable that the refractive index $n_2$ is lower than 1.53, if possible.

NINTH EMBODIMENT

The ninth embodiment of the present invention is a modification of the fiberscope 100 which is preferred as the eighth embodiment having the sectional configuration shown in FIG. 7, and adopts the NA value nearly equal to that of the eighth embodiment in combination with a refractive index $n_1$ of the cores 12 which is enhanced to 1.62004 corresponding to that of optical glass material F2. The ninth embodiment is composed of members specified for the numerical data shown below:

| Elements used for manufacturing fiberscope | | | | | |
|---|---|---|---|---|---|
| | Core element diameter $a_s$ | | Cladding element diameter $b_s$ | Number | $a_s/b_s$ value |
| No. 1 | 255μ | + | 400μ × | 2600 | (0.6375) |
| No. 2 | 243μ | + | 380μ × | 2600 | (0.6395) |
| No. 3 | 230μ | + | 360μ × | 2600 | (0.6389) |
| No. 4 | 217μ | + | 340μ × | 2600 | (0.6382) |
| No. 5 | 204μ | + | 320μ × | 2600 | (0.6375) |

Fiberscope obtained

Total length=0.35 m, 0.5 m, 3.5 m, 5.0 m and 8.0 m

Outside diameter=0.9 mm (jacket thickness=0.03 mm, coated layer thickness =0.05 mm)

Total number of pixels=13,000

Core distribution=random

NA=0.567

Refractive indices
  Core ($n_1$)=1.62004
  Cladding ($n_2$)=1.5177
  Jacket Layer ($n_3$)=1.53
  Coated resin layer ($n_4$)=1.5217 (containing carbon)
  $n_3/n_2$=1.0081

Spacing between cores ($\bar{d}$)=6.2μ in average (5.5μ to 6.9μ)

Cladding thickness ($\bar{c}$)=1.02μ in average

| Cores formed | | Core diameter (a) | Number |
|---|---|---|---|
| No. 1 | $a_{max}$ | 4.62μ × | 2600 |
| No. 2 | | 4.39μ × | 2600 |
| No. 3 | $\bar{a}$ | 4.16μ × | 2600 |
| No. 4 | | 3.93μ × | 2600 |
| No. 5 | $a_{min}$ | 3.69μ × | 2600 |

The ninth embodiment, in which the cores made of the optical glass F2 are slightly colored yellowish, is sufficiently usable for practice so long as it has a total length of approximately 8 m or so, but allows remarkable light absorption by the cores and loss of the amount of light to be caused when it has a total length exceeding 10 m.

TENTH EMBODIMENT

The tenth embodiment of the present invention is a modification of the fiberscope 100 which is preferred as the ninth embodiment having the sectional configuration shown in FIG. 7, and uses the value of the refractive index $n_1$ selected for the ninth embodiment in combination with a refractive index $n_2$ of the cladding 13 which has a smaller value and an NA value which is enhance to 0.636. The tenth embodiment consists of members specified for the numerical data listed below.

| | Elements used for manufacturing fiberscope | | | | |
|---|---|---|---|---|---|
| | Core element diameter $a_s$ | | Cladding element diameter $b_s$ | Number | $a_s/b_s$ value |
| No. 1 | 255μ | + | 400μ × 2600 | | (0.6375) |
| No. 2 | 243μ | + | 380μ × 2600 | | (0.6395) |
| No. 3 | 230μ | + | 360μ × 2600 | | (0.6389) |
| No. 4 | 217μ | + | 340μ × 2600 | | (0.6382) |
| No. 5 | 204μ | + | 320μ × 2600 | | (0.6375) |

Fiberscope obtained

Total length=0.35 m, 0.5 m, 3.5 m, 5.0 m and 8.0 m

Outside diameter=0.9 mm (jacket thickness=0.03 mm, coated layer thickness=0.05 mm)

Total number of pixels=13,000

Core distribution=random

NA=0.636

Refractive indices
  Core ($n_1$)=1.62004
  Cladding ($n_2$)=1.49
  Jacket Layer ($n_3$)=1.53
  Coated resin layer ($n_4$)=1.5217 (containing carbon)
  $n_3/n_2$=1.0268

Spacing between cores ($\bar{d}$)=6.2μ in average (5.5μ to 6.9μ)

Cladding thickness ($\bar{c}$)=1.02μ in average

| Cores formed | | Core diameter (a) | Number |
|---|---|---|---|
| No. 1 | $a_{max}$ | 4.62μ × 2600 | |
| No. 2 | | 4.39μ × 2600 | |
| No. 3 | $\bar{a}$ | 4.16μ × 2600 | |
| No. 4 | | 3.93μ × 2600 | |
| No. 5 | $a_{min}$ | 3.69μ × 2600 | |

The tenth embodiment which adopts a very large value of NA exhibits a remarkable effect for preventing the blurring of light. The tenth embodiment is affected by the coloring similar to that in the ninth embodiment described above.

ELEVENTH EMBODIMENT

The eleventh embodiment of the present invention is a modification of the fiberscope 100 preferred as the tenth embodiment which has the sectional configuration shown in FIG. 7, and adopts the NA value selected for the tenth embodiment in combination with a refractive index $n_1$ of the cores 12 which is enhanced to 1.64769 for obtaining a large NA value. The eleventh embodiment is composed of members prepared with the numerical data listed below.

| | Elements used for manufacturing fiberscope | | | | |
|---|---|---|---|---|---|
| | Core element diameter $a_s$ | | Cladding element diameter $b_s$ | Number | $a_s/b_s$ value |
| No. 1 | 255μ | + | 400μ × 2600 | | (0.6375) |
| No. 2 | 243μ | + | 380μ × 2600 | | (0.6395) |
| No. 3 | 230μ | + | 360μ × 2600 | | (0.6389) |
| No. 4 | 217μ | + | 340μ × 2600 | | (0.6382) |
| No. 5 | 204μ | + | 320μ × 2600 | | (0.6375) |

Fiberscope obtained

Total length=0.35 m, 0.5 m, 3.5 m and 5.0 m

Outside diameter=0.9 mm (jacket thickness=0.03 mm, coated layer thickness=0.05 mm)

Total number of pixels=13,000

Core distribution=random

NA=0.641

Refractive indices
  Core ($n_1$)=1.64769
  Cladding ($n_2$)=1.5177
  Jacket Layer ($n_3$)=1.53
  Coated resin layer ($n_4$)=1.5217 (containing carbon)
  $n_3/n_2$=1.0081

Spacing between cores ($\bar{d}$)=6.2μ in average (5.5μ to 6.9μ)

Cladding thickness ($\bar{c}$)=1.02μ in average

| Cores formed | | Core diameter (a) | Number |
|---|---|---|---|
| No. 1 | $a_{max}$ | 4.62μ × 2600 | |
| No. 2 | | 4.39μ × 2600 | |
| No. 3 | $\bar{a}$ | 4.16μ × 2600 | |
| No. 4 | | 3.93μ × 2600 | |
| No. 5 | $a_{min}$ | 3.69μ × 2600 | |

The eleventh embodiment which selects optical glass F2 as a material for the cores is disadvantageous in that the cores are colored yellowish though it can reduce the blurring of light. Since the coloring causes a loss in the amount of light, usable optical fibers are limited in length thereof. The eleventh embodiment can be put to practical use so far as it has a total length of 10 m or shorter.

Since the yellowish coloring tends to be more remarkable as the refractive index $n_1$ of the cores is enhanced, it is desirable to select, for optical fibers shorter than 10 m, a refractive index $n_1$ having a value within a range defined by the condition:

$$n_1 < 1.8 \tag{30}$$

Due to this limit of the refractive index $n_1$ and a lower limit of 1.47 which is imposed on the refractive index $n_2$ of the cladding 13, the value of NA is given by $$NA \leq \sqrt{1.8^2 - 1.47^2} \approx 1.0388 \tag{31}$$

For an illuminating light guide fiber to be used in combination with the image fiber affected by the yellowish coloring described above, it is effective to select a material such as quartz which is scarcely colored yellowish. Alternatively, it is possible to perform color balance by using filters or the similar members in a light source or correction of color balance by using an electronic circuit in a TV camera.

Further, it is hard to obtain a large value of NA and the blurring of light tends to increase when the refractive index $n_1$ is not within a range defined by the condition:

$$1.55 < n_1 \tag{32}$$

Twelfth through sixteenth embodiments of the present invention are modifications of the seventh through eleventh embodiments which have the sectional configuration shown in FIG. 7, and are composed of members which are different in geometrical dimensions and numbers of cores from the corresponding seventh through eleventh embodiments, though the refractive indices, numerical aperture, and materials are the same as, or similar to, those embodiments. The twelfth embodiment is a modification of the sixth embodiment which is obtained by enlarging this embodiment to 1.98 times as large in a geometrical form thereof. The twelfth embodiment which selects 235 micrometers as the average thickness $\bar{c}$ of the cladding 13 and 30,000 as the number of the cores 12 has merits in that it can form favorable images scarcely affected by the blurring of light, and has a high resolving power. The thirteenth through sixteenth embodiments have the same or similar features.

Thus, for the twelfth through sixteenth embodiments, only specifications will be described below.

TWELFTH EMBODIMENT

| | Elements used for manufacturing fiberscope | | | | | |
|---|---|---|---|---|---|---|
| | Core element diameter $a_s$ | | Cladding element diameter $b_s$ | | Number | $a_s/b_s$ value |
| No. 1 | 255μ | + | 400μ | × | 6000 | (0.6375) |
| No. 2 | 243μ | + | 380μ | × | 6000 | (0.6395) |
| No. 3 | 230μ | + | 360μ | × | 6000 | (0.6389) |
| No. 4 | 217μ | + | 340μ | × | 6000 | (0.6382) |
| No. 5 | 204μ | + | 320μ | × | 6000 | (0.6375) |

Fiberscope obtained

Total length=0.35 m, 0.5 m, 3.5 m and 10.0 m

Outside diameter=1.52 mm (jacket thickness=0.04 mm, coated layer thickness=0.05 mm)

Total number of pixels=30,000

Core distribution=random

NA=0.495

Refractive indices
 Core ($n_1$)=1.5963
 Cladding ($n_2$)=1.5177
 Jacket Layer ($n_3$)=1.53
 Coated resin layer ($n_4$)=1.5217 (containing carbon)
 $n_3/n_2$=1.0081

Spacing between cores ($\bar{d}$)=7.5μ in average (6.7μ to 8.3μ)
Cladding thickness ($\bar{c}$)=1.235μ in average

| Cores formed | | Core diameter (a) | | Number |
|---|---|---|---|---|
| No. 1 | $a_{max}$ | 5.586μ | × | 6000 |
| No. 2 | | 5.309μ | × | 6000 |
| No. 3 | $\bar{a}$ | 5.03μ | × | 6000 |
| No. 4 | | 4.76μ | × | 6000 |
| No. 5 | $a_{min}$ | 4.46μ | × | 6000 |

THIRTEENTH EMBODIMENT

| | Elements used for manufacturing fiberscope | | | | | |
|---|---|---|---|---|---|---|
| | Core element diameter $a_s$ | | Cladding element diameter $b_s$ | | Number | $a_s/b_s$ value |
| No. 1 | 255μ | + | 400μ | × | 6000 | (0.6375) |
| No. 2 | 243μ | + | 380μ | × | 6000 | (0.6395) |
| No. 3 | 230μ | + | 360μ | × | 6000 | (0.6389) |
| No. 4 | 217μ | + | 340μ | × | 6000 | (0.6382) |
| No. 5 | 204μ | + | 320μ | × | 6000 | (0.6375) |

Fiberscope obtained

Total length=0.35 m, 0.5 m, 3.5 m and 10.0 m

Outside diameter=1.54 mm (jacket thickness=0.04 mm, coated layer thickness=0.05 mm)

Total number of pixels=30,000

Core distribution=random

NA =0.573

Refractive indices
 Core ($n_1$)=1.5963
 Cladding ($n_2$)=1.49
 Jacket Layer ($n_3$)=1.53
 Coated resin layer ($n_4$)=1.565 (containing carbon)
 $n_3/n_2$=1.0268

Spacing between cores ($\bar{d}$)=7.5μ in average (6.7μ to 8.3μ)
Cladding thickness ($\bar{c}$)=1.235μ in average

| Cores formed | | Core diameter (a) | | Number |
|---|---|---|---|---|
| No. 1 | $a_{max}$ | 5.586μ | × | 6000 |
| No. 2 | | 5.309μ | × | 6000 |
| No. 3 | $\bar{a}$ | 5.03μ | × | 6000 |
| No. 4 | | 4.76μ | × | 6000 |
| No. 5 | $a_{min}$ | 4.46μ | × | 6000 |

FOURTEENTH EMBODIMENT

| | Elements used for manufacturing fiberscope | | | | | |
|---|---|---|---|---|---|---|
| | Core element diameter $a_s$ | | Cladding element diameter $b_s$ | | Number | $a_s/b_s$ value |
| No. 1 | 255μ | + | 400μ | × | 6000 | (0.6375) |
| No. 2 | 243μ | + | 380μ | × | 6000 | (0.6395) |
| No. 3 | 230μ | + | 360μ | × | 6000 | (0.6389) |
| No. 4 | 217μ | + | 340μ | × | 6000 | (0.6382) |
| No. 5 | 204μ | + | 320μ | × | 6000 | (0.6375) |

Fiberscope obtained

Total length=0.35 m, 0.5 m, 3.5 m, 0.5 m and 8.0 m

Outside diameter=1.54 mm (jacket thickness=0.04 mm, coated layer thickness=0.05 mm)

Total number of pixels=30,000

Core distribution=random

NA=0.567

Refractive indices
 Core ($n_1$)=1.62
 Cladding ($n_2$)=1.5177
 Jacket Layer ($n_3$)=1.53
 Coated resin layer ($n_4$)=1.5217 (containing carbon)
 $n_3/n_2$=1.0081

Spacing between cores ($\bar{d}$)=7.5μ in average (6.7μ to 8.3μ)

Cladding thickness $(\bar{c})$=1.235µ in average

| Cores formed | | Core diameter (a) | | Number |
|---|---|---|---|---|
| No. 1 | $a_{max}$ | 5.586µ | × | 6000 |
| No. 2 |  | 5.309µ | × | 6000 |
| No. 3 | $\bar{a}$ | 5.03µ | × | 6000 |
| No. 4 |  | 4.76µ | × | 6000 |
| No. 5 | $a_{min}$ | 4.46µ | × | 6000 |

FIFTEENTH EMBODIMENT

| | Elements used for manufacturing fiberscope | | | | |
|---|---|---|---|---|---|
| | Core element diameter $a_s$ | | Cladding element diameter $b_s$ | Number | $a_s/b_s$ value |
| No. 1 | 255µ | + | 400µ × 6000 | | (0.6375) |
| No. 2 | 243µ | + | 380µ × 6000 | | (0.6395) |
| No. 3 | 230µ | + | 360µ × 6000 | | (0.6389) |
| No. 4 | 217µ | + | 340µ × 6000 | | (0.6382) |
| No. 5 | 204µ | + | 320µ × 6000 | | (0.6375) |

Fiberscope obtained

Total length=0.35 m, 0.5 m, 3.5 m, 0.5 m and 8.0 m

Outside diameter=1.54 mm (jacket thickness=0.04 mm, coated layer thickness=0.05 mm)

Total number of pixels=30,000

Core distribution=random

NA=0.636

Refractive indices
  Core ($n_1$)=1.62002
  Cladding ($n_2$)=1.49
  Jacket Layer ($n_3$)=1.53
  Coated resin layer ($n_4$)=1.5217 (containing carbon)
  $n_3/n_2$=1.0268

Spacing between cores $(\bar{d})$=7.5µ in average (6.7µ to 8.3µ)

Cladding thickness $(\bar{c})$=1.235µ in average

| Cores formed | | Core diameter (a) | | Number |
|---|---|---|---|---|
| No. 1 | $a_{max}$ | 5.586µ | × | 6000 |
| No. 2 |  | 5.309µ | × | 6000 |
| No. 3 | $\bar{a}$ | 5.03µ | × | 6000 |
| No. 4 |  | 4.76µ | × | 6000 |
| No. 5 | $a_{min}$ | 4.46µ | × | 6000 |

SIXTEENTH EMBODIMENT

| | Elements used for manufacturing fiberscope | | | | |
|---|---|---|---|---|---|
| | Core element diameter $a_s$ | | Cladding element diameter $b_s$ | Number | $a_s/b_s$ value |
| No. 1 | 255µ | + | 400µ × 6000 | | (0.6375) |
| No. 2 | 243µ | + | 380µ × 6000 | | (0.6395) |
| No. 3 | 230µ | + | 360µ × 6000 | | (0.6389) |
| No. 4 | 217µ | + | 340µ × 6000 | | (0.6382) |

-continued

| | Elements used for manufacturing fiberscope | | | | |
|---|---|---|---|---|---|
| | Core element diameter $a_s$ | | Cladding element diameter $b_s$ | Number | $a_s/b_s$ value |
| No. 5 | 204µ | + | 320µ × 6000 | | (0.6375) |

Fiberscope obtained

Total length=0.35 m, 0.5 m, 3.5 m and 5.0 m

Outside diameter=1.54 mm (jacket thickness=0.04 mm, coated layer thickness=0.05 mm)

Total number of pixels=30,000

Core distribution=random

NA=0.641

Refractive indices
  Core ($n_1$)=1.64769
  Cladding ($n_2$)=1.5177
  Jacket Layer ($n_3$)=1.53
  Coated resin layer ($n_4$)=1.565 (containing carbon)
  $n_3/n_2$=1.0081

Spacing between cores $(\bar{d})$=7.5µ in average (6.7µ to 8.3µ)

Cladding thickness $(\bar{c})$=1.235µ in average

| Cores formed | | Core diameter (a) | | Number |
|---|---|---|---|---|
| No. 1 | $a_{max}$ | 5.586µ | × | 6000 |
| No. 2 |  | 5.309µ | × | 6000 |
| No. 3 | $\bar{a}$ | 5.03µ | × | 6000 |
| No. 4 |  | 4.76µ | × | 6000 |
| No. 5 | $a_{min}$ | 4.46µ | × | 6000 |

SEVENTEENTH EMBODIMENT

The seventeenth embodiment of the present invention is a modification of the fiberscope 100 preferred as the sixth embodiment which has the sectional configuration shown in FIG. 7, and has geometrical forms, such as the core diameters and the spacing between the cores, substantially the same as those of the sixth embodiment, in combination with the refractive index $n_1$ of the cores 12 which is enhanced to a value of 1.62004 for increasing the value of NA to 0.567. The seventeenth embodiment consists of members which are specified for the numerical data listed below.

| | Elements used for manufacturing fiberscope | | | | |
|---|---|---|---|---|---|
| | Core element diameter $a_s$ | | Cladding element diameter $b_s$ | Number | $a_s/b_s$ value |
| No. 1 | 255µ | + | 400µ × 600 | | (0.6375) |
| No. 2 | 243µ | + | 380µ × 600 | | (0.6395) |
| No. 3 | 230µ | + | 360µ × 600 | | (0.6389) |
| No. 4 | 217µ | + | 340µ × 600 | | (0.6382) |
| No. 5 | 204µ | + | 320µ × 600 | | (0.6375) |

Fiberscope obtained

Total length=0.35 m, 0.5 m, 1.5 m, 3.5 m and 10.0 m

Outside diameter=0.3 mm (jacket thickness=0.01 mm, coated layer thickness=0.03 mm)

Total number of pixels=3,000

Core distribution=random
NA=0.567
Refractive indices
  Core ($n_1$)=1.62004
  Cladding ($n_2$)=1.5177
  Jacket Layer ($n_3$)=1.53
  Coated resin layer ($n_4$)=1.5217 (containing carbon)
  $n_3/n_2$=1.0081
Spacing between cores ($\bar{d}$)=3.8μ in average (4.2μ to 3.482)
Cladding thickness ($\bar{c}$)=0.625μ in average

| Cores formed | | Core diameter (a) | | Number |
|---|---|---|---|---|
| No. 1 | $a_{max}$ | 2.83μ | × | 600 |
| No. 2 |  | 2.69μ | × | 600 |
| No. 3 | $\bar{a}$ | 2.55μ | × | 600 |
| No. 4 |  | 2.41μ | × | 600 |
| No. 5 | $a_{min}$ | 2.26μ | × | 600 |

Accordingly, the seventeenth embodiment can reduce the blurring of light to a magnitude lower than that in the sixth embodiment and is usable as a practical fiberscope so far as the seventeenth embodiment has a total length of nearly 10 m or less.

EIGHTEENTH EMBODIMENT

The eighteenth embodiment of the present invention is another modification of the fiberscope 100 preferred as the sixth embodiment having the sectional configuration shown in FIG. 7, and has geometrical forms, such as the core diameters and the spacing between the optical fibers, substantially the same as those of the sixth embodiment, but uses the value of the refractive index $n_2$ of the cladding 13 which is reduced to 1.49 and the value of NA which is increased to 0.573. The eighteenth embodiment is composed of members specified for the numerical data shown below.

| Elements used for manufacturing fiberscope | | | | | |
|---|---|---|---|---|---|
| | Core element diameter $a_s$ | | Cladding element diameter $b_s$ | Number | $a_s/b_s$ value |
| No. 1 | 255μ | + | 400μ | × 600 | (0.6375) |
| No. 2 | 243μ | + | 380μ | × 600 | (0.6395) |
| No. 3 | 230μ | + | 360μ | × 600 | (0.6389) |
| No. 4 | 217μ | + | 340μ | × 600 | (0.6382) |
| No. 5 | 204μ | + | 320μ | × 600 | (0.6375) |

Fiberscope obtained
  Total length=0.35 m, 0.5 m, 1.5 m, 3.5 m and 10.0 m
  Outside diameter=0.3 mm (jacket thickness=0.01 mm, coated layer thickness=0.03 mm)
  Total number of pixels=3,000
  Core distribution=random
  NA=0.573
  Refractive indices
    Core ($n_1$)=1.5963
    Cladding ($n_2$)=1.49
    Jacket Layer ($n_3$)=1.53
    Coated resin layer ($n_4$)=1.5217 (containing carbon)
    $n_3/n_2$=1.0268
  Spacing between cores ($\bar{d}$)=3.8μ in average (4.2μ to 3.4μ)
  Cladding thickness ($\bar{c}$)=0.625μ in average

| Cores formed | | Core diameter (a) | | Number |
|---|---|---|---|---|
| No. 1 | $a_{max}$ | 2.83μ | × | 600 |
| No. 2 |  | 2.69μ | × | 600 |
| No. 3 | $\bar{a}$ | 2.55μ | × | 600 |
| No. 4 |  | 2.41μ | × | 600 |
| No. 5 | $a_{min}$ | 2.26μ | × | 600 |

The eighteenth embodiment uses cores made of a material which has a refractive index which is not so high and which is scarcely colored yellowish, and assures little loss in the amount of light even when it has a total length of nearly 10 m to provide an excellent fiberscope.

NINETEENTH EMBODIMENT

The nineteenth embodiment of the present invention is still another modification of the sixth embodiment having the sectional configuration illustrated in FIG. 7, and has geometrical forms, such as the core diameters and the spacing between the optical fibers, substantially the same as those of tile sixth embodiment, but adopts values of the refractive index $n_1$ of the cores 12 and NA which are increased to 1.64769 and 0.641 respectively. The nineteenth embodiment is composed of members configured with the numerical data mentioned below.

| Elements used for manufacturing fiberscope | | | | | |
|---|---|---|---|---|---|
| | Core element diameter $a_s$ | | Cladding element diameter $b_s$ | Number | $a_s/b_s$ value |
| No. 1 | 255μ | + | 400μ | × 600 | (0.6375) |
| No. 2 | 243μ | + | 380μ | × 600 | (0.6395) |
| No. 3 | 230μ | + | 360μ | × 600 | (0.6389) |
| No. 4 | 217μ | + | 340μ | × 600 | (0.6382) |
| No. 5 | 204μ | + | 320μ | × 600 | (0.6375) |

Fiberscope obtained
  Total length=0.35 m, 0.5 m, 1.5 m, 3.5 m and 8.0 m
  Outside diameter=0.3 mm (jacket thickness=0.01 mm, coated layer thickness=0.03 mm)
  Total number of pixels=3,000
  Core distribution=random
  NA=0.641
  Refractive indices
    Core ($n_1$)=1.64769
    Cladding ($n_2$)=1.5177
    Jacket Layer ($n_3$)=1.53
    Coated resin layer ($n_4$)=1.565 (containing carbon)
    $n_3/n_2$=1.0081
  Spacing between cores ($\bar{d}$)=3.8μ in average (2.2μ to 3.2μ)
  Cladding thickness ($\bar{c}$)=0.625μ in average

| Cores formed | | Core diameter (a) | | Number |
|---|---|---|---|---|
| No. 1 | $a_{max}$ | 2.83μ | × | 600 |
| No. 2 |  | 2.69μ | × | 600 |
| No. 3 | $\bar{a}$ | 2.55μ | × | 600 |
| No. 4 |  | 2.41μ | × | 600 |

| Cores formed | | Core diameter (a) | | Number |
|---|---|---|---|---|
| No. 5 | $a_{min}$ | 2.26μ | × | 600 |

The nineteenth embodiment can reduce the blurring of light to a magnitude which is obtained by the sixth embodiment, but should have a total length shorter than 10 m since it uses a material for the cores which is colored yellowish rather remarkably.

TWENTIETH EMBODIMENT

The twentieth embodiment of the present invention is also a modification of the fiberscope preferred as the sixth embodiment having the sectional configuration shown in FIG. 7, and has geometrical forms, such as the core diameter and the spacing between the optical fibers, which are substantially the same as those adopted for the sixth embodiment but uses a value of 0.636 for NA which is increased by enhancing the refractive index $n_1$ of the cores 12 to 1.62004 and reducing the refractive index $n_2$ of the cladding 13 to 1.49. The fiberscope preferred as the twentieth embodiment is composed of members which are configured with the numerical data listed below.

| Elements used for manufacturing fiberscope | | | | | |
|---|---|---|---|---|---|
| | Core element diameter $a_s$ | | Cladding element diameter $b_s$ | Number | $a_s/b_s$ value |
| No. 1 | 255μ | + | 400μ | × 600 | (0.6375) |
| No. 2 | 243μ | + | 380μ | × 600 | (0.6395) |
| No. 3 | 230μ | + | 360μ | × 600 | (0.6389) |
| No. 4 | 217μ | + | 340μ | × 600 | (0.6382) |
| No. 5 | 204μ | + | 320μ | × 600 | (0.6375) |

Fiberscope obtained

Total length=0.35 m, 0.5 m, 1.5 m, 3.5 m and 10.0 m

Outside diameter=0.3 mm (jacket thickness=0.01 mm, coated layer thickness=0.03 mm)

Total number of pixels=3,000

Core distribution=random

NA=0.636

Refractive indices
  Core ($n_1$)=1.62004
  Cladding ($n_2$)=1.49
  Jacket Layer ($n_3$)=1.53
  Coated resin layer ($n_4$)=1.565 (containing carbon)
  $n_3/n_2$=1.0268

Spacing between cores ($\bar{d}$)=3.8μ in average (4.2μ to 3.4μ)

Cladding thickness ($\bar{c}$)=0.625μ in average

| Cores formed | | Core diameter (a) | | Number |
|---|---|---|---|---|
| No. 1 | $a_{max}$ | 2.83μ | × | 600 |
| No. 2 | | 2.69μ | × | 600 |
| No. 3 | $\bar{a}$ | 2.55μ | × | 600 |
| No. 4 | | 2.41μ | × | 600 |
| No. 5 | $a_{min}$ | 2.26μ | × | 600 |

The twentieth embodiment can be utilized sufficiently for practical use even when it has a total length of nearly 10 m since it selects a material for the cores which has a refractive index lower than that of the material of the cores used in the nineteenth embodiment and is little colored yellowish.

TWENTY-FIRST EMBODIMENT

The twenty-first embodiment of the present invention is a still further modification of the fiberscope preferred as the sixth embodiment having the sectional configuration shown in FIG. 7, and has geometrical forms, such as the core diameter and the spacing between cores, which are the substantially the same as those of the sixth embodiment, but adopts the value of the refractive index $n_1$ of the cores 12 which is enhanced to 1.7474 together with the value of NA increased to 0.866. Members which compose the twenty-first embodiment are configured with the numerical data listed below.

| Elements used for manufacturing fiberscope | | | | | |
|---|---|---|---|---|---|
| | Core element diameter $a_s$ | | Cladding element diameter $b_s$ | Number | $a_s/b_s$ value |
| No. 1 | 255μ | + | 400μ | × 600 | (0.6375) |
| No. 2 | 243μ | + | 380μ | × 600 | (0.6395) |
| No. 3 | 230μ | + | 360μ | × 600 | (0.6389) |
| No. 4 | 217μ | + | 340μ | × 600 | (0.6382) |
| No. 5 | 204μ | + | 320μ | × 600 | (0.6375) |

Fiberscope obtained

Total length=0.35 m, 0.5 m, 1.5 m, 3.5 m and 8.0 m

Outside diameter=0.3 mm (jacket thickness=0.01 mm, coated layer thickness=0.03 mm)

Total number of pixels=3,000

Core distribution=random

NA=0.866

Refractive indices
  Core ($n_1$)=1.7474
  Cladding ($n_2$)=1.5177
  Jacket Layer ($n_3$)=1.53
  Coated resin layer ($n_4$)=1.565 (containing carbon)
  $n_3/n_2$=1.0081

Spacing between cores ($\bar{d}$)=3.8μ in average (4.2μ to 3.4μ)

Cladding thickness ($\bar{c}$)=0.625μ in average

| Cores formed | | Core diameter (a) | | Number |
|---|---|---|---|---|
| No. 1 | $a_{max}$ | 2.83μ | × | 600 |
| No. 2 | | 2.69μ | × | 600 |
| No. 3 | $\bar{a}$ | 2.55μ | × | 600 |
| No. 4 | | 2.41μ | × | 600 |
| No. 5 | $a_{min}$ | 2.26μ | × | 600 |

The twenty-first embodiment in which the cores have a high refractive index can suppress strongly the blurring of light. However, the twenty-first embodiment should preferably have a total length shorter than 10 m since the cores used therein absorb light having short wavelengths rather remarkably.

Though the cores are distributed at random in the embodiments described above, functions or effects which are similar to those of the embodiments can be obtained even by regularly arranging a plurality of kinds of cores. Further, plastic materials, rubbers, etc. which have high refractive indices and high transmittances can also be used in place of the multi-component material selected for the embodiments of the present invention.

Design examples of the image fiber have been described above on the basis of the experimental results obtained in the sixth embodiment and the theory of optics. In summary, it is possible to obtain an image fiber having a total length of 10 m or less by designing geometrical forms, such as the core diameter and the spacing between the cores, which are obtained by enlarging, or similarity of, those selected for the first embodiment, and by using a value of NA selected for the sixth embodiment. Further, an image fiber assuring less blurring of light can be designed by reducing the total length of the sixth embodiment to 1.5 m or 3.5 m.

Figure 13:
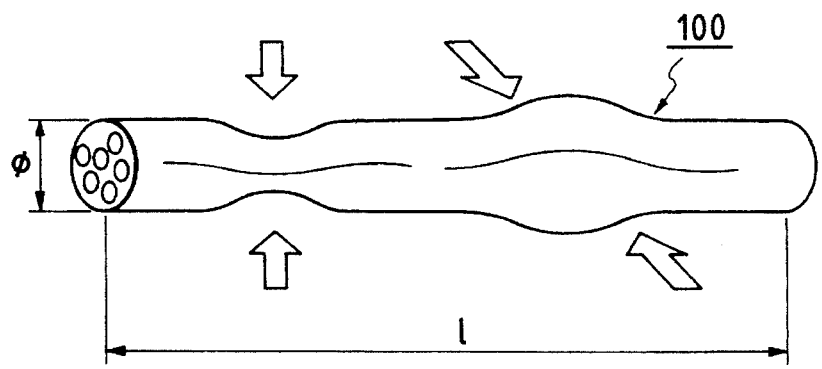
FIGS. 13 and 14 are diagrams illustrating another modification of the image fiber according to the present invention.
Figure 14:
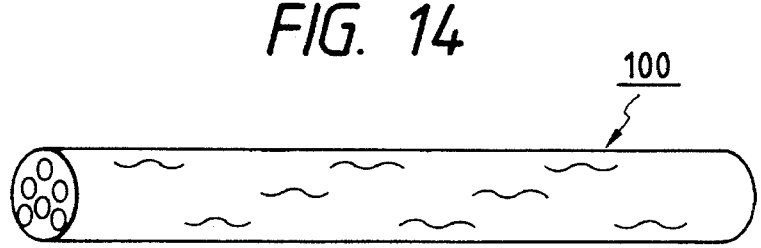

When an image fiber has a total length shorter than 1 m, and more strictly, when a ratio of a total length l of an image fiber to a diameter φ thereof is 1000 or less, the image fiber cannot eliminate the unwanted light sufficiently because of a small number of reflections from the jacket glass and the resin coating, whereby the image fiber may allow flare to remain on images. In such a case, the image fiber should be deformed by crushing several portions thereof as illustrated in FIG. 13. Alternatively, concavities or irregularities may be formed at several portions of an image fiber as shown in FIG. 14 so as to increase the amount of light incident on the jacket glass and resin coating, thereby eliminating the unwanted light. Further, deformation such as that shown in FIG. 13 can be made by applying pressures in the directions indicated by arrows during the cooling performed immediately after the drawing stage of an image fiber, or the irregularities shown in FIG. 14 can be easily formed by mechanically pressing rods or the like against the image fiber.

What is claimed is:

1. An image fiber comprising:

a plurality of optical fibers each having a V-value defined by an equation:

$$V = ka\sqrt{(n_1^2 - n_2^2)}$$

where $k=2\pi/\lambda$, $\lambda$ is a wavelength of light propagatable through a respective one of said plurality of optical fibers, a is a radius of a core of said respective one of said plurality of optical fibers, $n_1$ is a refractive index of said core of said respective one of said plurality of optical fibers, and $n_2$ is a refractive index of a cladding corresponding to said respective one of said plurality of optical fibers;

said plurality of optical fibers including plural optical fibers having a first V-value and plural optical fibers having a second V-value different from said first V-value;

said plurality of optical fibers including plural optical fibers having a first number of propagation modes of light propagatable therethrough and plural optical fibers having a second number of propagation modes of light propagatable therethrough, said second number of propagation modes being different from said first number of propagation modes.

2. An image fiber according to claim 1, wherein said plurality of optical fibers includes at least five separate pluralities of optical fibers having respective V-values different from one another.

3. An image fiber according to claim 1, wherein a number of said plural optical fibers having said first V-value is different from a number of said plural optical fibers having said second V-value.

4. An image fiber according to claim 1, wherein:

a core of each of said plurality of optical fibers having said refractive index $n_1$ of at least 1.55;

said cladding covers peripheries of said plurality of optical fibers, said plurality of optical fibers being distributed in said cladding;

said plurality of optical fibers includes plural optical fibers having a first core diameter and plural optical fibers having a second core diameter different from said first core diameter;

said cladding satisfies the following condition:

$$(0.495/NA)^{4.4} \sqrt{(l/3.5\bar{\lambda})} < \bar{c} < 4\bar{\lambda}$$

where NA is a numerical aperture of said image fiber, l is a total length of said image fiber, $\bar{\lambda}$ is an average wavelength of light to be propagated through said image fiber, and $\bar{c}$ is an average thickness of said cladding relative to each one of said plurality of optical fibers.

5. An image fiber according to claim 4, wherein said image fiber has a total length of no more than 10 m.

6. An image fiber according to claim 4, wherein:

said first core diameter differs from said second core diameter by at least 0.05 μm;

a ratio of said first core diameter to said second core diameter is no more than 1.5; and said cladding further satisfies the following condition:

$$\lambda \leq \bar{c} \leq 4\lambda.$$

7. An image fiber according to claim 4, wherein said respective cores of said plurality of optical fibers include multi-component glass.

8. An image fiber according to claim 4, wherein a diametral ratio of said cladding corresponding to each of said plurality of optical fibers to said core of said respective one of said plurality of optical fibers is substantially constant.

9. An image fiber according to claim 4, wherein said average thickness of said cladding relative to each one of said plurality of optical fibers further satisfies the following equation:

$$1.8 \text{ μm} > \bar{c} > 0.8 \text{ μm}.$$

10. An image fiber according to claim 4, wherein a ratio of said first normalized frequency to said second normalized frequency is at least 1.03.

11. An image fiber according to claim 4, wherein a ratio of said first core diameter to said second core diameter is no more than 1.3.

12. An image fiber according to claim 1, wherein said first normalized frequency differs from said second normalized frequency by at least 5%.

13. An image fiber according to claim 1, wherein said first normalized frequency is at least 2.405 and said second normalized frequency is at least 3.83.

14. An image fiber according to claim 1, wherein said plurality of said optical fibers is at least 3000.

15. An image fiber according to claim 1, wherein said plurality of said optical fibers is at least 10,000.

16. An image fiber according to claim 1, wherein a ratio of said first normalized frequency to said second normalized frequency is at least 1.03.

17. An image fiber according to claim 1, wherein:

said cladding covers peripheries of said plurality of optical fibers, said plurality of optical fibers being distributed in said cladding;

said image fiber further comprising:

a jacket glass layer having a refractive index $n_3$, on said cladding; and a resin layer having a refractive index $n_4$, on said jacket glass layer;

said image fiber further satisfying the following equations:

$$n_3 > n_2 > n_4 \quad 1.05 > n_3/n_2 > 1.003.$$

18. An image fiber according to claim 1, wherein a periphery of first and second ends of said image fiber each have a first diameter, and a periphery of a portion of said image fiber between said first and second ends of said image fiber has a second diameter which is substantially smaller than said first diameter.

19. An image fiber according to claim 1, wherein:

said cladding covers peripheries of said plurality of optical fibers, said plurality of optical fibers being distributed in said cladding; and said image fiber has at least one crushed portion between first and second ends of said image fiber.

20. An image fiber according to claim 1, wherein:

said cladding covers peripheries of said plurality of optical fibers, said plurality of optical fibers being distributed in said cladding; and said image fiber has at least one concave portion in said cladding between first and second ends of said image fiber.

* * * * *